United States Patent
Sauter

(10) Patent No.: US 10,233,899 B2
(45) Date of Patent: Mar. 19, 2019

(54) HYDROSTATIC AXIAL PISTON MACHINE

(71) Applicant: Robert Bosch GmbH, Stuttgart (DE)

(72) Inventor: Markus Sauter, Roggenburg (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 15/479,623

(22) Filed: Apr. 5, 2017

(65) Prior Publication Data

US 2017/0292495 A1    Oct. 12, 2017

(30) Foreign Application Priority Data

Apr. 11, 2016    (DE) .................. 10 2016 106 635

(51) Int. Cl.
*F04B 1/20*    (2006.01)
*F03C 1/32*    (2006.01)
*F03C 1/36*    (2006.01)
*F16K 15/02*   (2006.01)

(52) U.S. Cl.
CPC .......... *F03C 1/0652* (2013.01); *F03C 1/0657* (2013.01); *F04B 1/205* (2013.01); *F16K 15/026* (2013.01)

(58) Field of Classification Search
CPC ....... F04B 1/2078; F04B 1/324; F04B 49/002
See application file for complete search history.

(56) References Cited

U.S. PATENT DOCUMENTS

| | | | | |
|---|---|---|---|---|
| 3,803,987 A | * | 4/1974 | Knapp | F04B 1/324 |
| | | | | 91/506 |
| 3,877,839 A | * | 4/1975 | Ifield | F04B 1/2071 |
| | | | | 417/217 |
| 2009/0084258 A1 | * | 4/2009 | Stoelzer | F04B 1/16 |
| | | | | 91/505 |

FOREIGN PATENT DOCUMENTS

DE    10 2005 037 619 A1    2/2007

* cited by examiner

*Primary Examiner* — Thomas E Lazo
(74) *Attorney, Agent, or Firm* — Maginot, Moore & Beck LLP

(57) ABSTRACT

A hydrostatic axial piston machine includes a double-acting actuating cylinder configured to adjust the piston displacement. The actuating cylinder has two actuating chambers that are connected to two spatially separated cartridge valves. The two cartridge valves are inserted obliquely into a wall section of the axial piston machine. The wall section on the one hand forms a wall of the housing of the axial piston machine and on the other hand forms a wall of the actuating cylinder.

15 Claims, 4 Drawing Sheets

D-D

HYDROSTATIC AXIAL PISTON MACHINE

This application claims priority under 35 U.S.C. §119 to patent application no. DE 10 10 2016 106 635.4, filed on Apr. 11, 2016 in Germany, the disclosure of which is incorporated herein by reference in its entirety.

BACKGROUND

The disclosure relates of a hydrostatic axial piston machine in a swashplate type of design.

In axial piston machines in a swashplate type of construction, the inclined position of the swashplate is adjusted in relation to the drive shaft for adjusting the piston displacement—to be more exact, for adjusting the swallowing capacity in the case of axial piston motors or the delivery volume in the case of axial piston pumps.

Shown in printed publication DE 10 2005 037 619 A1 is a control valve unit for a double-acting actuating cylinder, the actuating piston of which separates two oppositely acting actuating chambers from each other. The position of the actuating piston determines the pivot angle of the swashplate and therefore the piston displacement of the axial piston machine. For the filling and emptying of the two actuating chambers, provision is made in the control valve unit for a respective control valve, the two valve bodies of which are connected to each other via a common spring. The control valve unit is built onto a housing of the axial piston machine.

A disadvantage of such axial piston machines is equipment engineering and production engineering cost for the passage bores which on the one hand have to be provided in the housing of the control valve unit and on the other hand in the housing of the axial piston machine itself. Therefore, for example for connecting the two control valves to the two actuating chambers provision has to be made in each case for a plurality of passage bores in the housing of the control valve unit and also passage bores in the housing of the axial piston machine.

In contrast, the disclosure is based on the object of creating an axial piston machine, the equipment engineering and production engineering cost of which for the passage bores of the adjustment device is reduced.

SUMMARY

This object is achieved by means of an axial piston machine having the features of the disclosure.

The hydrostatic axial piston machine—especially an axial piston pump—has a swashplate which by means of an actuating piston which is connected thereto can be pivoted from a neutral point in both directions, as a result of which the piston displacement of the axial piston machine across the neutral point can be adjusted. To this end, the actuating piston can be moved in a double-acting actuating cylinder in a so-called actuating piston plane which is arranged perpendicularly to an axis of the drive shaft of the axial piston machine. As a result, a so-called transverse adjustment ensues. The actuating piston delimits two oppositely acting actuating chambers of the double-acting actuating cylinder, which actuating chambers can be supplied with pressurized actuating medium via a respective control valve and from which pressurized actuating medium can be released via the respective control valve. According to the disclosure, the valve bodies—especially the valve pistons—of the two control valves are positioned obliquely to the axis of the drive shaft and obliquely to the actuating piston plane. Therefore, as a result of passage bores the possibility is created of minimizing the production cost of the passages of the adjustment device of the axial piston machine according to the disclosure. In particular, the passage bores for connecting a feed pump and for connecting the two actuating chambers to the two control valves are simpler to produce.

Further advantageous embodiments of the disclosure are described in the dependent patent claims.

The two valve bodies preferably have a parallel distance from each other and in the process span a so-called valve body plane which is correspondingly positioned obliquely to the axis of the drive shaft and obliquely to the actuating piston plane, and which extends in a space between the actuating pistons and a cylinder barrel. If the valve bodies in this case are arranged, at least in certain sections, in the space or "sunk" into this, an installation space-saving arrangement of the control valves ensues. This arrangement is more compact than that of the prior art in which the control valve unit is built onto the housing of the axial piston machine. Furthermore, with this arrangement the connection of the feed pump and the connection of the two actuating chambers to the two control valves is particularly simple to produce as a result of oblique and short passage bores which are positioned obliquely to the valve bodies.

In this case, the valve body plane runs preferably parallel to the movement direction of the actuating piston and the two valve bodies are symmetrical to a longitudinal plane of the axial piston machine in which lies the axis of the drive shaft.

If the two valve bodies are basically accommodated inside an outer side of a housing of the axial piston machine, they are basically accommodated in a wall of the housing. Passage bores for the connections can then be provided in this wall of the housing.

In a particularly preferred development of the axial piston machine according to the disclosure, the two control valves are cartridge valves, the valve housings of which are designed as cartridges which are inserted into installation holes of the housing of the axial piston machine. As a result, the two installation holes are positioned obliquely to the axis of the drive shaft and obliquely to the actuating piston plane, in a similar way to the valve bodies.

In order to save on the respective length and therefore the respective installation space for screw-in threads of the cartridges in the two installation holes, the cartridges can have in each case sockets on the side for screws via which respective cartridges can be clamped in the respective installation hole. To this end, the screws penetrate the outer side of the housing and engage in the wall of the housing.

In a particularly preferred embodiment, the two installation holes penetrate the wall of the housing and open into an interior space of the housing. A respective tank port of the respective control valve can then be arranged on the respective inner end sections of the two cartridges. As a result, a connection of the control valves to the tank is created with minimal cost.

If the end faces of the cartridges are closed, e.g. because the control valves are pressure control valves, a respective connection is formed between the interior of the housing and the respective tank port as a result of a respective radial distance between the respective installation hole and the respective outer circumference of the respective inner end section.

Preferably arranged on the outer circumferences of the cartridges is a respective, roughly annular, actuating pressure port of the respective control valve which is connected via a respective actuating pressure passage to the respective actuating chamber.

In respect to equipment engineering, it is particularly simple if the two actuating pressure passages are produced in each case as a single communication bore between a respective connecting bore, which is closed off by a seal, and the respective installation hole. A common seal then suffices for its common hole.

To this end, the two connecting bores are preferably arranged parallel to the actuating piston plane, and the two communication bores are preferably arranged obliquely to the actuating piston plane or to the respective connecting bore and obliquely to the respective installation hole. A diameter of the two communication bores is smaller than a diameter of the two connecting bores. A drill for the communication bore can then be introduced through the connecting bore.

The control valve is preferably a respective continuously adjustable 3/2 directional valve with a respective, roughly annular, feed pressure port which is formed on the two outer circumferences of the cartridges. The actuating pressure port is then arranged in each case between the tank port and the feed pressure port.

In respect to production engineering, it is simple if the feed pressure port of the first control valve is connected via a first feed pressure passage to a feed pump, whereas the feed pressure port of the second control valve is connected via a second feed pressure passage to the feed pressure port of the first control valve.

The second feed pressure passage is preferably arranged parallel to the actuating piston.

The second feed pressure passage is preferably arranged in the valve body plane.

In a particularly preferred development, the two control valves are in each case pressure control valves, the respective valve bodies of which are acted upon by the respective actuating pressure with a respective resulting force. This force together with a respective spring acts upon the respective valve body in the direction of a release of pressurized actuating medium from the respective connected actuating chamber. A respective preferably electric actuator acts opposite to it in the direction of a supply of the respective actuating chamber with pressurized actuating medium.

The resulting force in the direction of the release of pressurized actuating medium from the respectively connected actuating chamber is created by the two valve bodies being a stepped piston in each case. In this case, a respective larger end face, which is acted upon by the actuating pressure and on which also acts the respective spring, is formed in the two inner end sections of the cartridges on the respective stepped piston. Furthermore, a respective further smaller end face, which is acted upon by the actuating pressure and which acts opposite to the larger end face and to the spring, is formed on the two stepped pistons.

A respective pressure and spring chamber, which is delimited by the larger end face, is simply formed in respect to the production engineering if a respective end face, which is arranged on the inner end section of the two cartridges, is closed by a respective spring plate on which the respective spring is supported. In this case, the respective larger end face, which is acted upon by the actuating pressure, is arranged in the respective inner end section of the cartridges.

The two actuating pressure ports and/or the two feed pressure ports are preferably roughly annular pressure chambers which are formed between the respective installation hole and the respective cartridge.

The afore-described axial piston machine in a preferred application case is an axial piston pump which is used in a closed hydraulic circuit.

BRIEF DESCRIPTION OF THE DRAWINGS

An exemplary embodiment of an axial piston machine according to the disclosure is shown in the drawings. The disclosure is now explained in more detail with reference to the figures of these drawings.

In the drawings.

DETAILED DESCRIPTION

Figure 1:
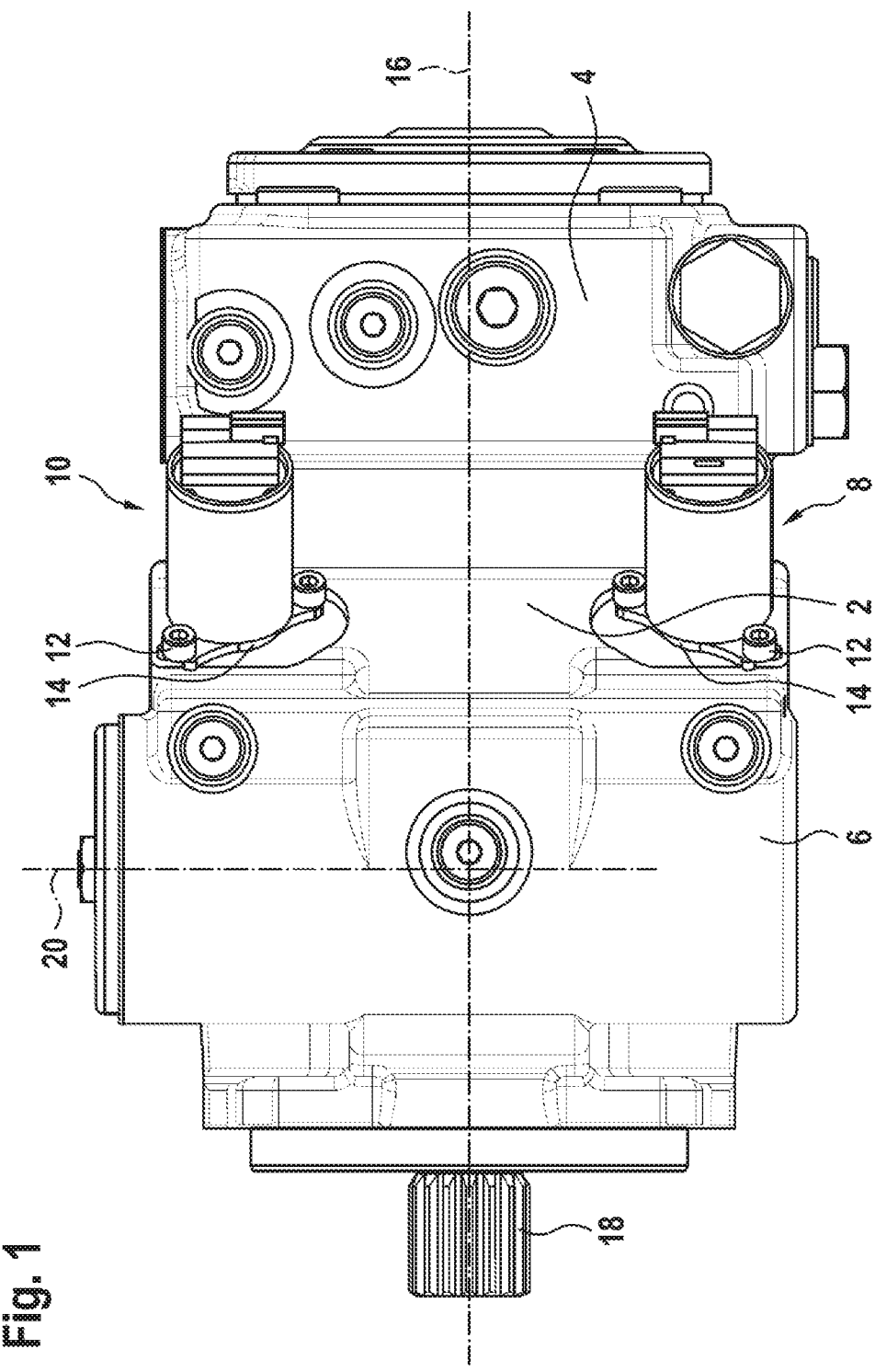
FIG. 1 shows in a plan view an axial piston machine according to the disclosure according to the exemplary embodiment.

FIG. 1 shows a plan view of a housing of an axial piston machine according to the disclosure which is designed as an axial piston pump. The housing has a first housing section 2 and a second housing section 4. Formed in one piece and integrally with the first housing section 2 is an actuating cylinder 6 which has an adjustment device for the pivot angle of a swashplate (not shown in FIG. 1) of the axial piston machine. As a result, the piston displacement of the axial piston machine can be adjusted from a neutral point in two different directions. Therefore, a delivery direction during pumping operation of the axial piston machine can be varied and furthermore steplessly adjusted.

The swashplate is connected to an actuating piston which separates two actuating chambers of the actuating cylinder 6 from each other. For the filling or for the supplying of the actuating chambers with pressurized actuating medium and for the emptying or releasing of pressurized actuating medium from the actuating chambers, a respective pressure control valve 8, 10 is fastened on the first housing section 2. The pressure control valves 8, 10 are designed as cartridge valves which are inserted, at least in certain sections, into the first housing section 2 and are fixed there by two screws 12 in each case. In this case, the two pressure control valves 8, 10 have in each case a flange 14 on which are formed two oppositely disposed, roughly U-shaped, recesses which are provided as sockets for the screws 12.

Via the adjustment device, which is explained more accurately with regard to the following figures, the swashplate can be pivoted in relation to an axis 16 of a drive shaft 18. In this case, the adjustment device is constructed as a transverse adjustment device in which the actuating piston (not shown) of the actuating cylinder 6 can be moved along an actuating piston plane 20 which is arranged perpendicularly to the axis 16 of the drive shaft 18.

Figure 2:
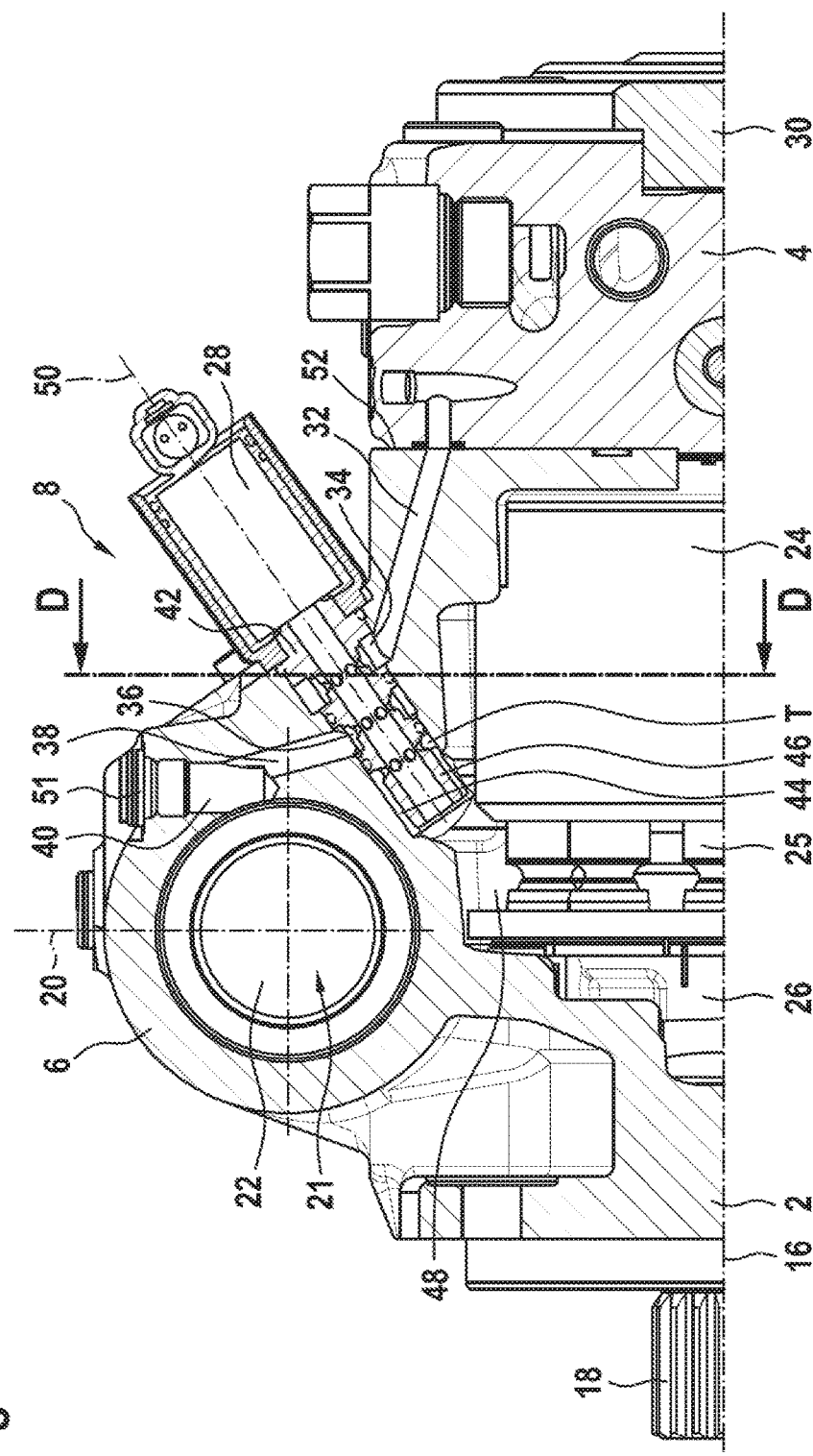
FIG. 2 shows a longitudinal section through the axial piston machine from FIG. 1.

FIG. 2 shows in a longitudinal section the axial piston machine from FIG. 1. In this case, the plane of intersection runs through the first pressure control valve 8 and through the first actuating chamber 21 which is associated therewith. The actuating piston 22 is therefore also visible.

Also shown is a cylinder barrel 24, which rotates with the drive shaft 18, and in which are inserted a plurality of circumferentially distributed pistons 25. These are pivotably connected to the swashplate 26. The swashplate 26 is supported on the first housing section 2 and in FIG. 2 is shown in its center zero-stroke position.

For increasing the pivot angle of the swashplate 26 and therefore for increasing the stroke of the pistons 25 in the cylinder barrel 24, the axial piston machine, operated as a pump, for creating a first delivery direction, pressurizes the first actuating chamber 21 with pressurized actuating medium via the first pressure control valve 8, while the pressurized actuating medium of the second actuating chamber (not shown) is released via the second pressure control valve 10 (shown in FIG. 1). To this end, an electric actuator 28 of the first pressure control valve 8 is energized so that this opens a connection from a feed pump 30 via a first feed pressure passage 32 and via a feed pressure port 34 to an actuating pressure port 36. From there, the pressurized actuating medium flows via an actuating pressure passage 38 and via a connecting bore 40 into the first actuating chamber 21.

Figure 4:
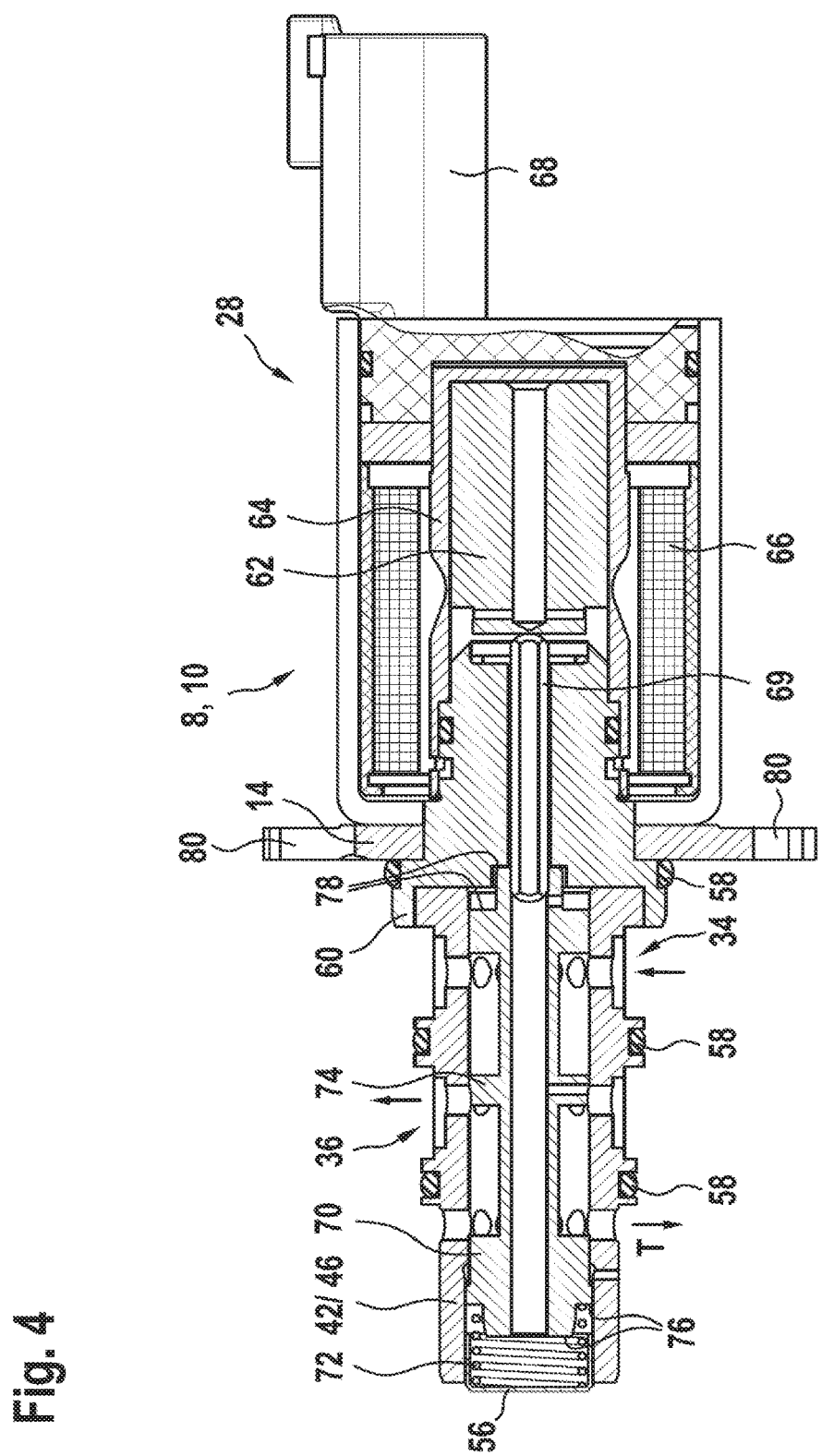
FIG. 4 shows in a longitudinal section a pressure control valve of an adjustment device of the axial piston machine from FIG. 1.

The construction and the function of the two pressure control valves 8, 10 is explained more precisely with reference to FIG. 4.

Also shown in FIG. 2 is that a cartridge 42 of the pressure control valves 8, 10 is inserted into an installation hole 44 of the first housing section 2. In this case, the installation hole 44 penetrates the first housing section 2 so that an inner end section 46 of the cartridge 42 projects into an interior space 48 of the housing 2, 4. Since the installation hole 44 is at a distance from the inner end section 46 of the cartridge 42, a connection from a tank port T of the pressure control valve 8, 10 to the interior space 48 of the housing 2, 4 is formed there. The tank port T of the pressure control valve 8, 10 is formed in an encompassing manner on the cartridge 42 and arranged adjacent to the inner end section 46 of the cartridge 42. The feed pressure port 34 is arranged adjacent to the actuator 28. The actuating pressure port 36 is arranged between the tank port T and the feed pressure port 34. The feed pressure port 34 and the actuating pressure port 36 are designed as annular pressure chambers between the cartridge 42 and the installation hole 44.

The valve bodies (not shown in FIG. 2) of the pressure control valves 8, 10 can be moved in the respective cartridge 42 and as a result of their parallel distance from each other defined a so-called valve body plane 50 which could also be referred to as a pressure control valve plane. As a result, both valve bodies move along the valve body plane 50. The valve body plane 50 is oriented obliquely to the actuating piston plane 20 and obliquely to the axis 16 of the drive shaft 18 and in this case runs through between the actuating chambers 21 and the cylinder barrel 24. As a result, the cartridge 42 is arranged in directly proximity to the actuating chambers 21. Consequently, the actuating pressure passage 38, which connects the actuating pressure port 36 to the connecting bore 40, can be produced by means of a single short communication bore.

Since a diameter of the connecting bore 40 is larger than a diameter of the actuating pressure passage 38, an oblique position of the actuating pressure passage 38 in relation to the connecting bore 40 is simple to realize in respect to production engineering. Furthermore, after the drilling of the connecting bore 40 and the actuating pressure passage 38 only a seal 51 for closing off the common hole in the wall of the first housing section 2 is required.

The first feed pressure passage 32 is also produced by means of a single oblique bore on a side of the cartridge 42 of the first pressure control valve 8 facing away from the actuating pressure passage 38 and the actuating cylinder 6. This single bore connects a contact face 52 of the first housing section 2, against which butts the second housing section 4, to the feed pressure port 34.

Figure 3:
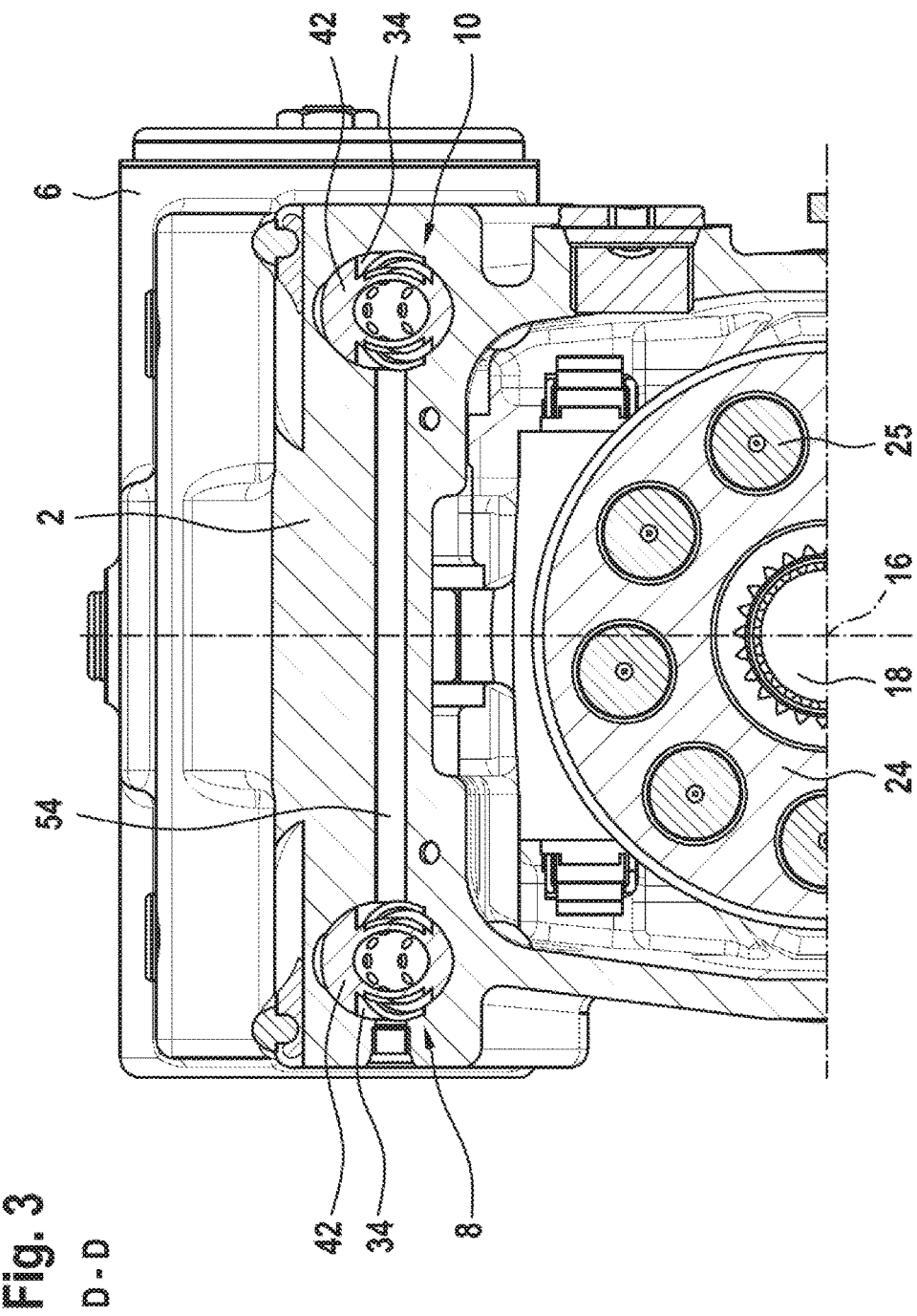
FIG. 3 shows a section along the line D-D from FIG. 2.

FIG. 3 shows the axial piston machine of the preceding figures in a cross section through the first housing section 2. The plane of intersection (D-D) is drawn in in FIG. 2 and runs through the cylinder barrel 24 and the pistons 25. Also shown are the two cartridges 42 of the pressure control valves 8, 10 (again without the valve bodies guided therein). The plane of intersection runs through the two feed pressure ports 34. The supply of the second pressure control valve 10 with pressurized feed medium is effected from the feed pressure port 34 of the first pressure control valve 8 via a second feed pressure passage 54 which runs parallel to the actuating piston plane 20 (cf. FIG. 2).

FIG. 4 shows one of the two similarly constructed pressure control valves 8, 10. It is designed as a cartridge valve with the cartridge 42. The inner end section 46 of the cartridge 42 is closed off on the end face by a spring plate 56. Starting from there, the tank port T, an O-ring 58, the actuating pressure port 36, a further O-ring 58 and the feed pressure port 34 are arranged on the outer circumference of the cartridge 42. The electric actuator 28 is fastened on the cartridge 42. To be more exact, a pole core 60 is fastened on the cartridge 42, and arranged on its outer side facing away from the cartridge 42 is an armature 62. This is movably accommodated in a pressure tube 64 and together with the armature 60 is encompassed by a solenoid 66.

With energizing of the solenoid 66 via a connector 68, the armature 62 is moved in the direction toward the pole core 60 and via a plunger 69 which is movably accommodated in the pole core 60 therefore forces the valve body 70, designed as a valve piston, to the left in FIG. 4. This takes place against the force of a spring 72 which is arranged in the inner end section 46 of the cartridge 42 and which is supported on the spring plate 56. With energizing of the electric actuator 28, the valve body 70 is displaced from the position which is pretensioned by the spring 72 and shown in FIG. 4 in the direction toward the spring plate 56 so that instead the connection (shown in FIG. 4) from the actuating pressure port 36 to the tank port T is closed, while at the same time a connection from the feed pressure port 34 to the actuating pressure port 36 is opened. To this end, the valve body 70 has a piston collar 74 in the region of the actuating pressure port 36.

In the piston collar 74, provision is made for a bore via which an inner longitudinal bore of the valve body 70 is continuously pressurized by actuating pressure. As a result, a larger end face 76 and a smaller end face 78 of the valve body 70 are also pressurized by actuating pressure. The larger end face 76 is arranged inside the end section 46 of the cartridge 42 and together with the spring 72, which also butts against this end face 76, acts in a direction in which the actuating pressure port 36 is increasingly connected to the tank port T. The smaller end face 78 in comparison is arranged in the region of the connection of the cartridge 72 to the pole core 60 and acts in an opposite direction in which the actuating pressure port 36 is increasingly connected to the feed pressure port 34. For this reason, the valve body 70 is a stepped piston.

In the region of the connection of the cartridge 42 and the pole core 60, provision is made for an outer O-ring 58 which seals the feed pressure port 34 to the outside. Between the outer O-ring 58 and a housing of the actuator 28, provision is made for the flange 14 which has the two illustrated (with reference to FIG. 1) oppositely disposed sockets 80 for screws 12. Via these, the cartridge 42 is retained in the installation hole 44 (cf. FIG. 2).

Disclosed is a hydrostatic axial piston machine with a double-acting actuating cylinder for adjusting the piston displacement, wherein the two actuating chambers of the actuating cylinder are connected to two spatially separated cartridge valves which are inserted obliquely into a wall section of the axial piston machine. The wall section on the one hand forms a wall of the housing of the axial piston machine and on the other hand forms a wall of the actuating cylinder.

LIST OF DESIGNATIONS

2 First housing section
4 Second housing section
6 Actuating cylinder
8 First pressure control valve
10 Second pressure control valve
12 Screw
14 Flange
16 Axis
18 Drive shaft
20 Actuating piston plane
21 First actuating chamber
22 Actuating piston
24 Cylinder barrel
25 Piston
26 Swashplate
28 Electric actuator
30 Feed pump
32 First feed pressure passage
34 Feed pressure port
36 Actuating pressure port
38 Actuating pressure passage
40 Connecting bore
42 Cartridge
44 Installation hole
46 Inner end section
48 Interior space
50 Valve body plane
51 Seal
52 Contact face
54 Second feed pressure passage
56 Spring plate
58 O-ring
60 Pole core
62 Armature
64 Pressure tube
66 Solenoid
68 Connector
69 Plunger
70 Valve body
72 Spring
74 Piston collar
76 Larger end face
78 Smaller end face
80 Socket
T Tank pressure/Tank port

What is claimed is:

1. A hydrostatic axial piston machine comprising:
a drive shaft;
an actuating piston configured to be moved in an actuating piston plane arranged perpendicularly to the drive shaft; and
a swashplate configured to be adjusted across a neutral point by the actuating piston,
wherein the actuating piston delimits two actuating chambers acting against each other to which pressurized actuating medium is configured to be respectively supplied via a respective control valve and from which pressurized actuating medium is configured to be respectively released via the respective control valve, and
wherein respective valve bodies of the two control valves are arranged obliquely to the drive shaft and obliquely to the actuating piston plane.

2. The axial piston machine according to claim 1, wherein the two valve bodies have a parallel distance from each other and are arranged in a valve body plane that is oblique to the drive shaft and oblique to the actuating piston plane, and wherein the valve body plane is arranged between the actuating piston and a cylinder barrel.

3. The axial piston machine according to claim 1, wherein the two valve bodies are accommodated inside an outer side of a housing of the axial piston machine.

4. The axial piston machine according to claim 3, wherein the two control valves are cartridge valves, the valve housings of which are configured as cartridges that are inserted into respective installation holes of the housing of the axial piston machine.

5. The axial piston machine according to claim 4, wherein the two cartridges have in each case sockets on the side for screws, via which the cartridges are configured to be fastened in the respective installation holes.

6. The axial piston machine according to claim 4, wherein the two installation holes penetrate the housing of the axial piston machine and open into an interior space of the housing, and wherein a respective tank port is arranged on respective inner end sections of the two cartridges.

7. The axial piston machine according to claim 6, wherein on respective outer circumferences of the two inner end sections a respective connection is formed between the interior space of the housing and the respective tank port.

8. The axial piston machine according to claim 4, wherein a respective actuating pressure port is arranged on respective outer circumferences of the two cartridges, the respective actuating pressure port connected via a respective actuating pressure passage to the respective actuating chamber.

9. The axial piston machine according to claim 4, wherein the two actuating pressure passages are configured as respective communication bores between a respective connecting bore and the respective installation hole, the respective connecting bore closed off by a seal.

10. The axial piston machine according to claim 9, wherein:
the two connecting bores are arranged parallel to the actuating piston plane,
the two communication bores are arranged obliquely to the respective connecting bore and obliquely to the respective installation hole, and
a diameter of the two communication bores is smaller than a diameter of the two connecting bores.

11. The axial piston machine according to claim 8, wherein the two installation holes penetrate the housing of the axial piston machine and open into an interior space of the housing, a respective tank port arranged on respective inner end sections of the two cartridges, and wherein a feed pressure port is formed in each case on the two outer circumferences of the cartridges, the actuating pressure port arranged in each case between the tank port and the feed pressure port.

12. The axial piston machine according to claim 11, wherein the feed pressure port of the first control valve is connected via a first feed pressure passage to a feed pump, and wherein the feed pressure port of the second control valve is connected via a second feed pressure passage to the feed pressure port of the first control valve.

13. The axial piston machine according to claim 1, wherein the two control valves are pressure control valves in each case, and wherein the two valve bodies are acted upon by the respective actuating pressure with a respective resulting force which together with a respective spring acts upon the respective valve body in the direction of a release of pressurized actuating medium from the respectively connected actuating chamber.

14. The axial piston machine according claim 13, wherein:
- the two control valves are cartridge valves, the valve housings of which are configured as cartridges that are inserted into respective installation holes of the housing of the axial piston machine,
- the two installation holes penetrate the housing of the axial piston machine and open into an interior space of the housing, and a respective tank port is arranged on respective inner end sections of the two cartridges,
- a respective larger end face, which is acted upon by the actuating pressure and on which also acts the respective spring, is formed on the respective valve body in the two inner end sections of the cartridges, and
- a respective further smaller end face, which is acted upon by the actuating pressure and acts against the larger end face and the spring, is formed on the respective valve body.

15. The axial piston machine according to claim 14, wherein a respective end face, which is arranged on the inner end section of the two cartridges, is closed by a respective spring plate on which is supported the respective spring, and wherein the respective larger end face, which is acted upon by the actuating pressure, is arranged in the respective inner end section of the two cartridges.

* * * * *